(12) United States Patent
Jain et al.

(10) Patent No.: US 11,457,422 B2
(45) Date of Patent: Sep. 27, 2022

(54) SYSTEM AND METHOD FOR REPEATER TDD SYNCHRONIZATION

(71) Applicant: Kumu Networks, Inc., Sunnyvale, CA (US)

(72) Inventors: Mayank Jain, Sunnyvale, CA (US); Jung-Il Choi, Sunnyvale, CA (US); Tanvi Jadhav, Sunnyvale, CA (US)

(73) Assignee: Kumu Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/464,438

(22) Filed: Sep. 1, 2021

(65) Prior Publication Data

US 2022/0070802 A1 Mar. 3, 2022

Related U.S. Application Data

(60) Provisional application No. 63/187,506, filed on May 12, 2021, provisional application No. 63/073,089, filed on Sep. 1, 2020.

(51) Int. Cl.
| | |
|---|---|
| *H04W 56/00* | (2009.01) |
| *H04W 72/04* | (2009.01) |
| *H04W 72/12* | (2009.01) |
| *H04L 5/14* | (2006.01) |

(52) U.S. Cl.
CPC ......... *H04W 56/001* (2013.01); *H04L 5/1469* (2013.01); *H04W 56/004* (2013.01); *H04W 72/0446* (2013.01); *H04W 72/1263* (2013.01)

(58) Field of Classification Search
CPC ............. H04W 56/001; H04W 56/004; H04W 72/0446; H04W 72/1263; H04L 5/1469
See application file for complete search history.

(56) References Cited

U.S. PATENT DOCUMENTS

| | | | |
|---|---|---|---|
| 2007/0268846 A1 | 11/2007 | Proctor et al. | |
| 2009/0047913 A1 | 2/2009 | Kuru | |
| 2009/0190510 A1* | 7/2009 | Kobayashi | H04L 27/2678 370/280 |
| 2013/0155939 A1* | 6/2013 | Lee | H04B 7/15528 370/315 |
| 2015/0215059 A1 | 7/2015 | Kerpez et al. | |

(Continued)

OTHER PUBLICATIONS

Seo, Young-Ho , et al., "Low-Cost High-Performance TDD Synchronizer for WiBro RF Repeater", ETRI Journal, vol. 32, No. 4, Aug. 2010.

(Continued)

*Primary Examiner* — Khaled M Kassim
*Assistant Examiner* — Zhaohui Yang
(74) *Attorney, Agent, or Firm* — Jeffrey Schox; Samuel Rosenthal

(57) ABSTRACT

A repeater system, preferably including one or more radio transceivers, such as a 5G NR transceiver configured to communicate with other elements of a 5G NR communication network such as user equipment and/or gNBs, and a signal processor. A method for repeater operation, preferably including determining synchronization information, operating in a synchronized repeater mode, and maintaining synchronization (such as by monitoring periodic signal timing and adjusting operation timing based on the monitoring), and optionally including operating in a fallback repeater mode.

22 Claims, 14 Drawing Sheets

(56) References Cited

U.S. PATENT DOCUMENTS

2018/0351633 A1   12/2018  Birkmeir et al.
2020/0228217 A1    7/2020  Ahn et al.
2021/0160801 A1*  5/2021  Lim .................... H04L 7/0087
2021/0219172 A1*  7/2021  Kobayashi ........... H04W 28/06
2021/0258904 A1*  8/2021  Lee ................... H04W 56/002

OTHER PUBLICATIONS

"Way Forward on TDD repeaters", 3GPP TSG-RAN WG4 #98bis-e, R4-2106110, Electronic meeting, Apr. 12-20, 2021.

* cited by examiner

SYSTEM AND METHOD FOR REPEATER TDD SYNCHRONIZATION

CROSS-REFERENCE TO RELATED APPLICATIONS

This application claims the benefit of U.S. Provisional Application Ser. No. 63/073,089, filed on 1 Sep. 2020, and of U.S. Provisional Application Ser. No. 63/187,506, filed on 12 May 2021, each of which is incorporated in its entirety by this reference.

TECHNICAL FIELD

This invention relates generally to the radio repeater field, and more specifically to a new and useful system and method for repeater time-division duplexing (TDD) synchronization in the radio repeater field.

BACKGROUND

Cellular repeaters can help improve signal quality for areas not well covered by cellular basestations. Many cellular networks use time-division duplexing (TDD) to split transmission times between base station to the user and user to the base station. For repeaters deployed in such networks, there can be many benefits to having the repeater synchronize to the TDD timing of the network, such as reduced hardware cost, better performance, and/or lower noise injection in the network.

Typical TDD synchronization requires either the use of an external control signal provided to a repeater (e.g., providing a synchronization signal), or implementation of real-time modem functionality at the repeater (e.g., enabling the repeater to determine synchronization information in the same manner as endpoints of the network). However, it may not be practical to provide an external control signal to some repeaters, and real-time model functionality will typically increase repeater costs, such as by requiring the use of expensive dedicated hardware. Thus, there is a need in the radio repeater field to create a new and useful system and method for repeater TDD synchronization.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1A:
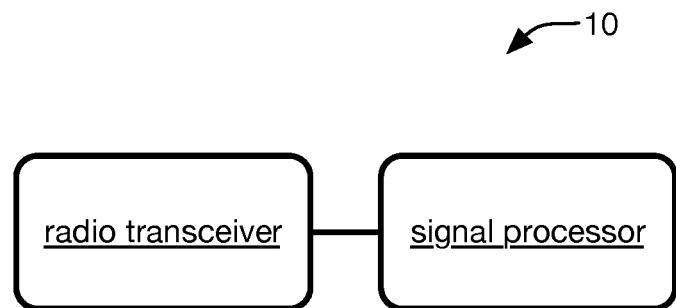
FIGS. 1A-1B are schematic representations of a first and second embodiment, respectively, of a repeater system.
Figure 1B:
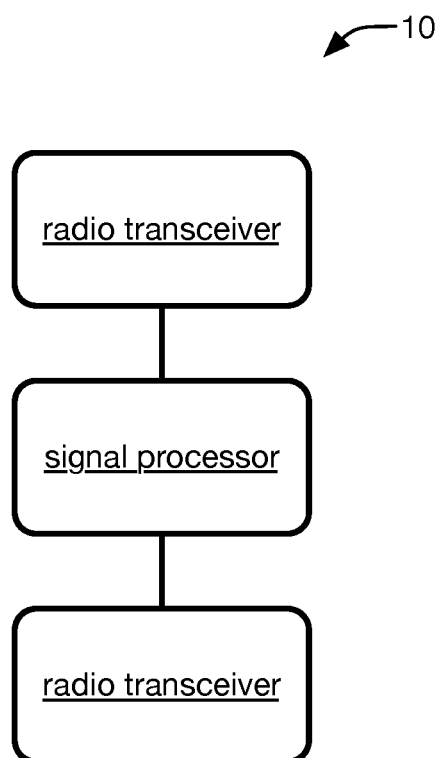
Figure 1C:
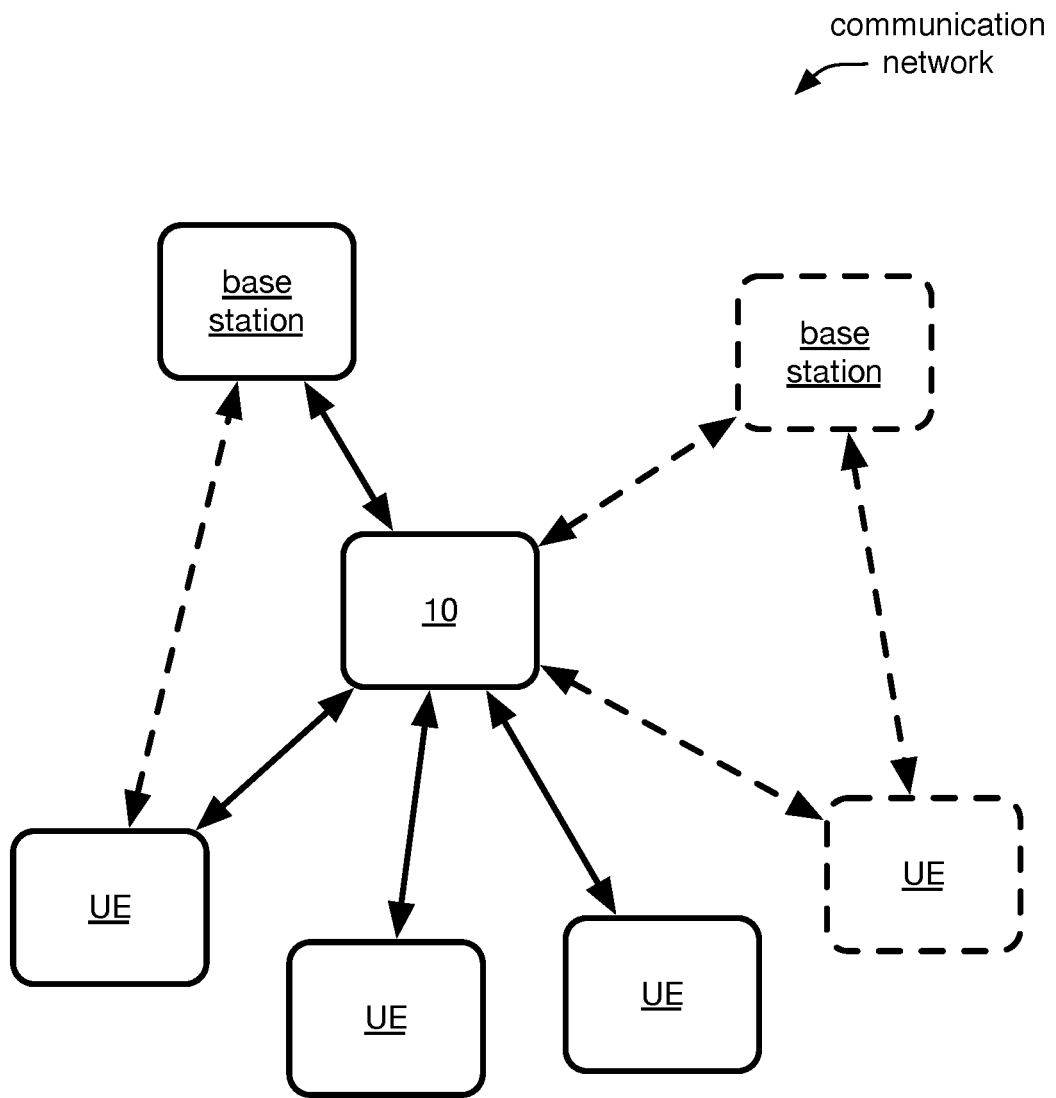
FIG. 1C is a schematic representation of an embodiment of a communication network including the repeater system.

A repeater system 10 preferably includes one or more radio transceivers and a signal processor (e.g., as shown in FIGS. 1A-1B), or optionally multiple signal processors. In examples, the radio transceiver can be a 5G NR transceiver (e.g., configured to communicate with other elements of a 5G NR communication network, such as user equipment (UE) and/or base stations (gNBs), and/or otherwise configured to participate in 5G NR networking), such as a mmWave (e.g., 5G Frequency Range 2 (FR2)) and/or longer wavelength (e.g., Sub-6 GHz, such as 5G Frequency Range 1 (FR1)) transceiver, but can additionally or alternatively be any other suitable radio transceiver. In some examples, the radio transceiver can include a phased array of transmission elements (e.g., enabling beamforming), but can additionally or alternatively include a single transmission element, a plurality of transmission elements in any other suitable arrangement, and/or include any other suitable elements. However, the system 10 can additionally or alternatively include any suitable transmitter(s) and/or receiver(s), and/or any other suitable elements. The signal processor (e.g., in cooperation with the radio transceiver and/or any other suitable elements of the system) is preferably configured to perform the method 20 described below, but can additionally or alternatively be any other suitable signal processor. The repeater system 10 is preferably configured to participate in a communication network, such as a network including one or more UEs and base stations (e.g., as shown in FIG. 1C)

Figure 9A:
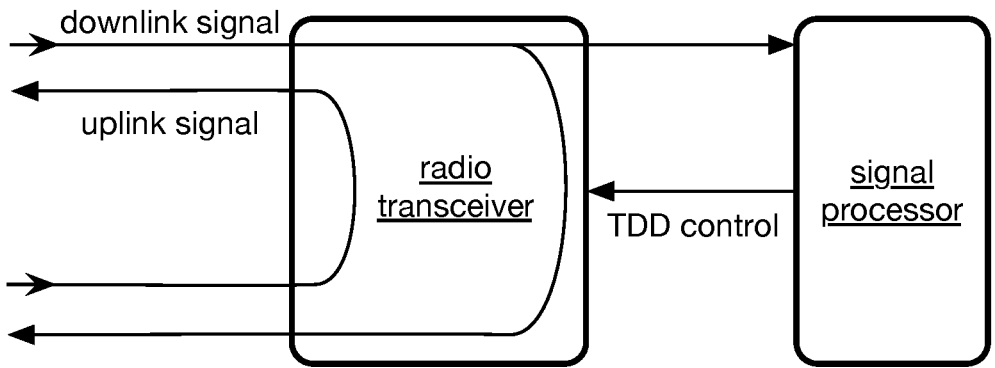
FIGS. 9A-9B are schematic representations of signals in the first and second embodiments, respectively, of the repeater system.

In a first embodiment (e.g., as shown in FIG. 9A), in which the system 10 includes a single radio transceiver, the transceiver can receive and re-radiate uplink and/or downlink signals, can pass some or all downlink signals to the signal processor (e.g., which processes the digitized signals such as described below regarding the method 20), and/or can receive control signals (e.g., TDD control signals) from the signal processor, such as described in more detail below regarding the method 20.

Figure 9B:
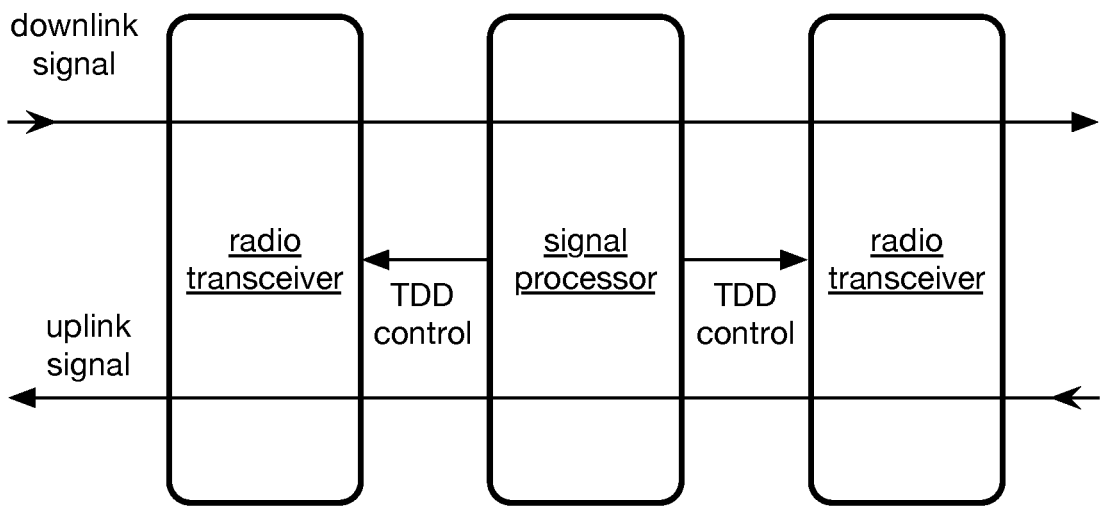

In a second embodiment (e.g., as shown in FIG. 9B), in which the system 10 includes two radio transceivers, the first transceiver can receive downlink signals and pass them to the signal processor (e.g., as digital signals), and the signal processor can pass these downlink signals on to the second transceiver to be re-radiated and/or can process the digitized signals (e.g., such as described below regarding the method 20). Similarly, the second transceiver can receive uplink signals and pass them to the first transceiver (e.g., passed via the signal processor, preferably as digital signals; passed directly to the first transceiver, preferably as analog signals; etc.) to be re-radiated. Further, in this embodiment, the signal processor preferably provides control signals (e.g., TDD control signals) to both transceivers (or alternatively, to only one of the transceivers), such as described in more detail below regarding the method 20.

However, the system 10 can additionally or alternatively be configured to implement the method 20 in any other suitable manner.

Figure 2:
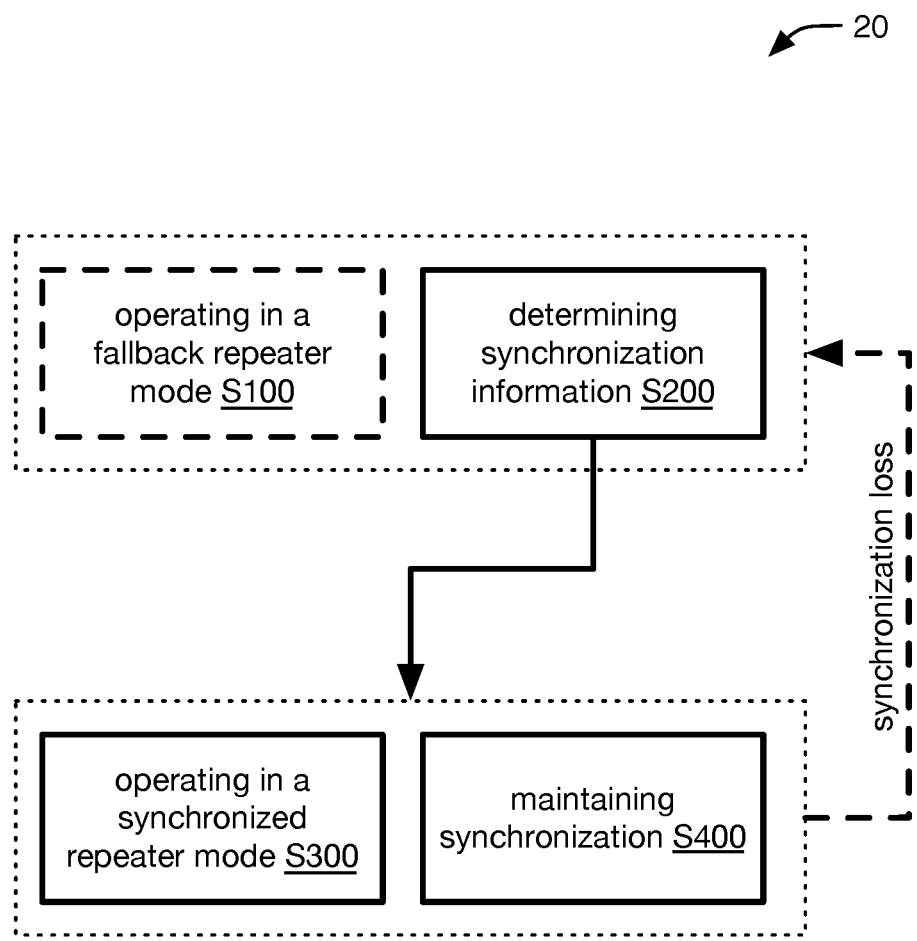
FIG. 2 is a schematic representation of an embodiment of a method for repeater operation.

A method 20 for repeater operation preferably includes determining synchronization information S200, operating in a synchronized repeater mode S300, and maintaining synchronization S400 (e.g., as shown in FIG. 2), and can optionally include operating in a fallback repeater mode S100. The method preferably functions to enable use of one or more repeaters in a communication network employing time-division duplexing (TDD), such as a 5G NR communication network which preferably includes one or more UEs and gNBs. However, the method can additionally or alternatively include any other suitable elements performed in any suitable manner. The method 20 is preferably performed using the repeater system 10 described herein, but can additionally or alternatively be performed using any other suitable systems.

Embodiments of the repeater system and/or method for repeater operation can confer several potential benefits. For example, embodiments of the system and/or method can achieve and maintain TDD synchronization within a communications network (e.g., 5G NR network), without the use of a modem. In some embodiments, the system and/or method can enable semi-offline processing (e.g., in embedded software) to achieve and/or maintain TDD synchronization, rather than relying on dedicated modem hardware, thereby reducing the cost and/or complexity of the system. However, the system and/or method can additionally or alternatively confer any other suitable benefits.

2. Method.

2.1 Operating in a Fallback Repeater Mode.

Operating in a fallback repeater mode S100 can function to provide a subset of repeater functionality while synchronization (e.g., TDD synchronization) is unavailable (e.g., not yet achieved).

Figure 3A:
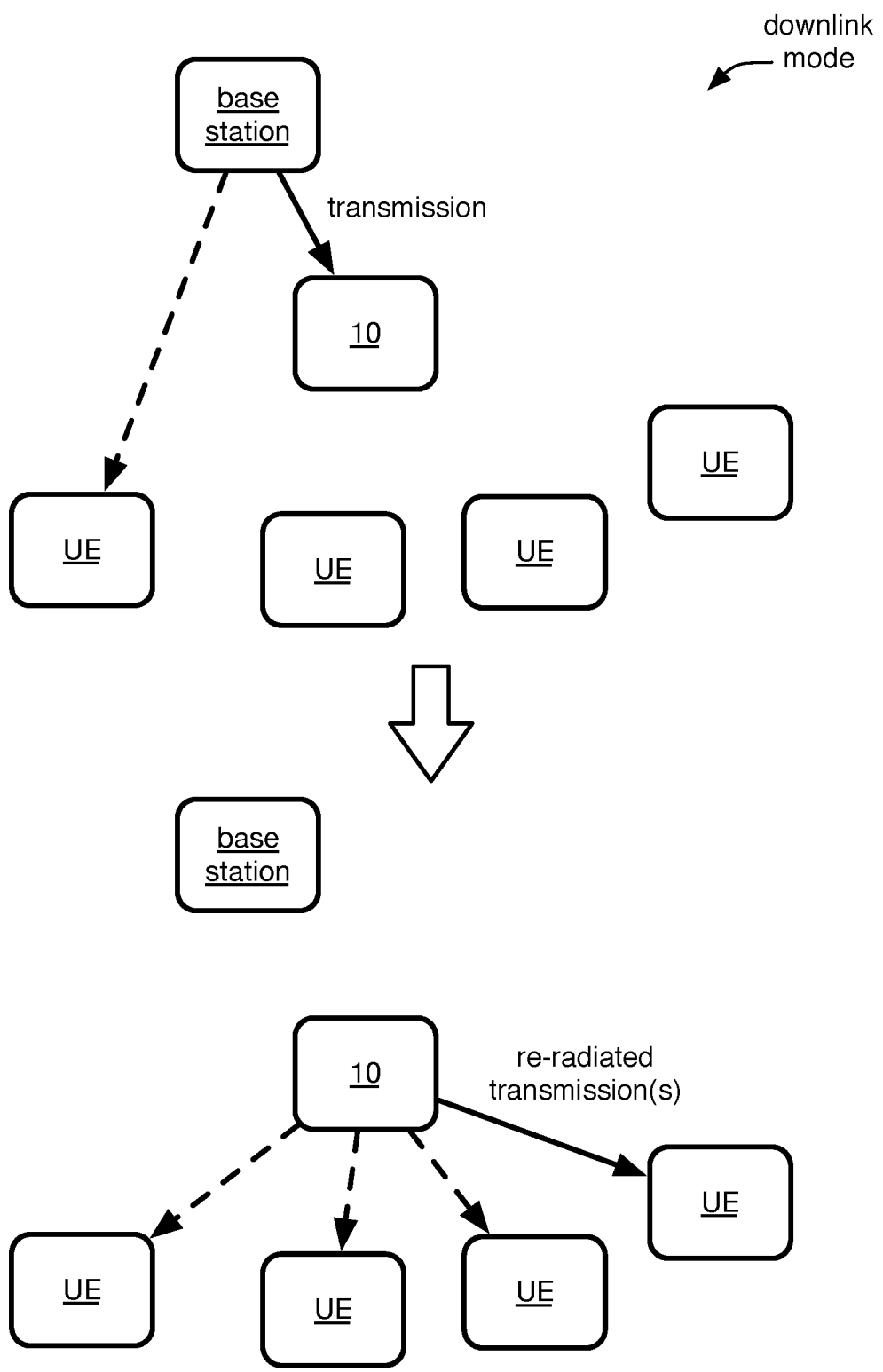
FIGS. 3A-3C are schematic representations of an example of operating in a downlink mode, an uplink mode, and a downlink receive-only mode, respectively.
Figure 3B:
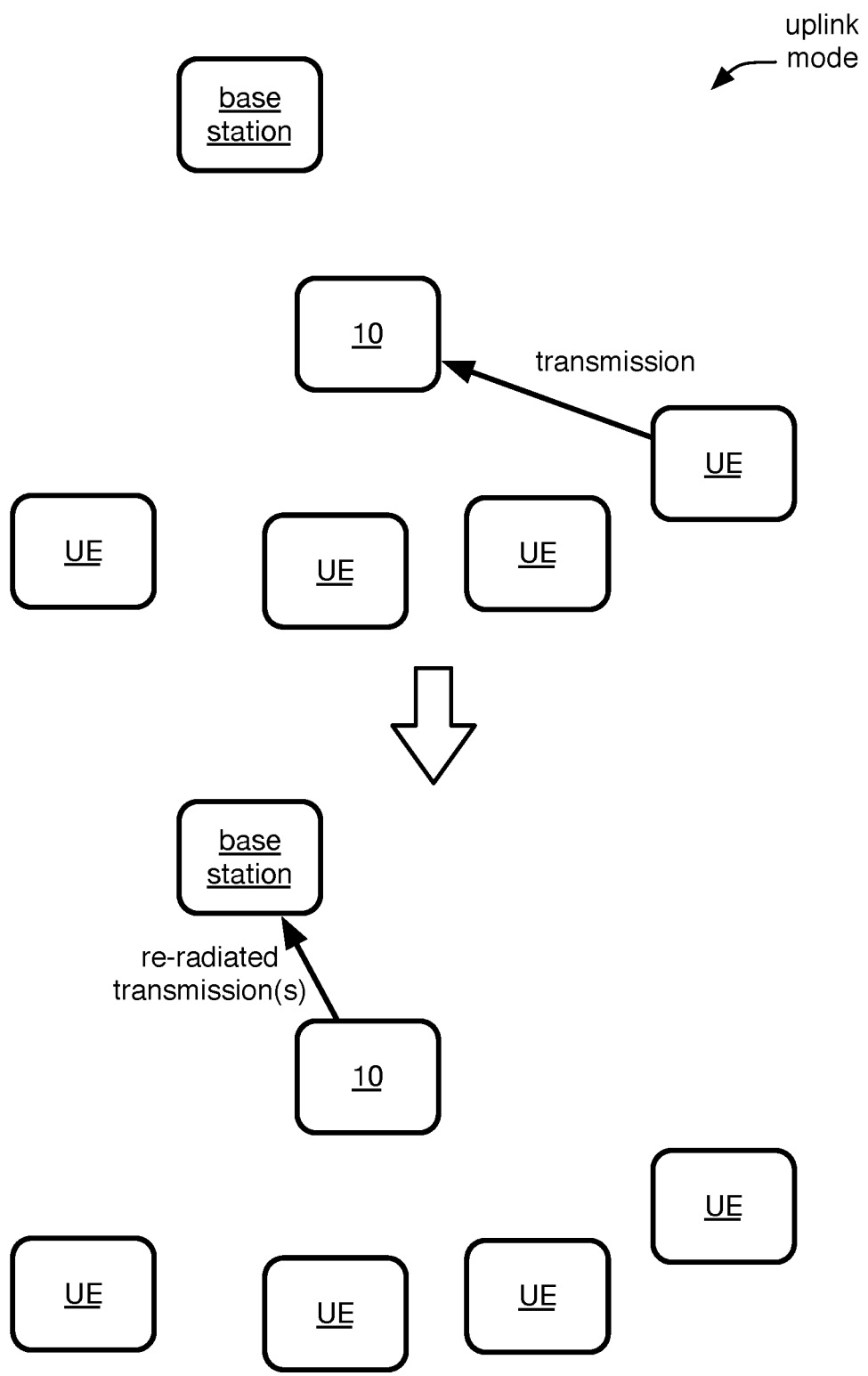
Figure 3C:
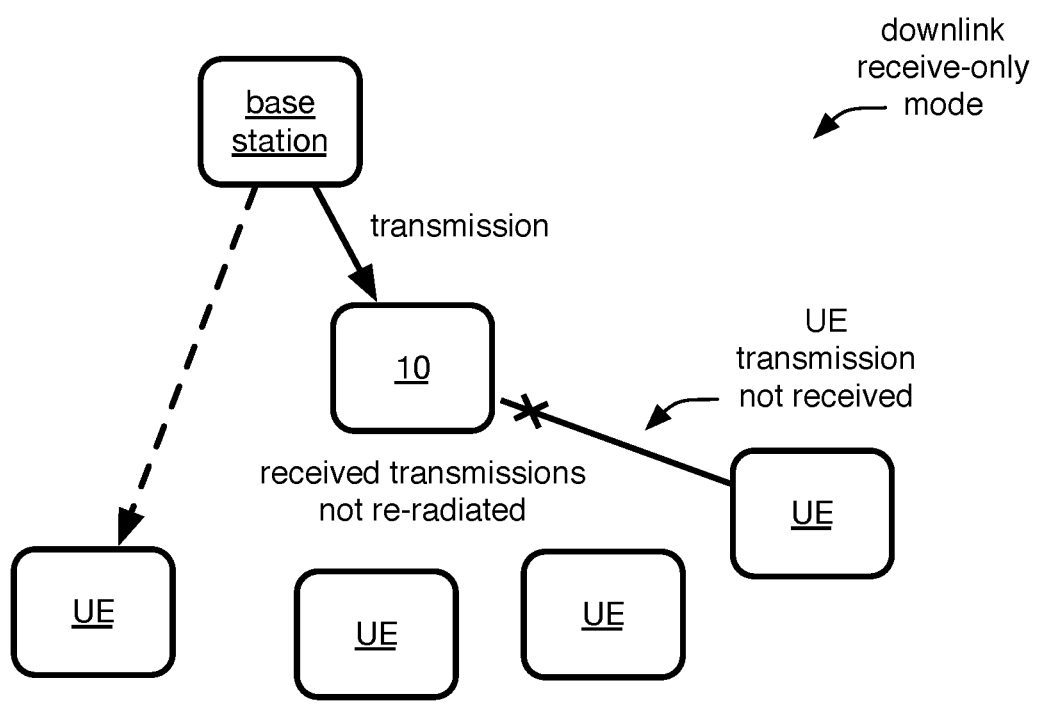

While performing S100, the repeater preferably operates in one or more receive-only modes in which it can receive, but does not repeat, transmissions from a base station (e.g., gNB) and/or one or more UEs; more preferably operating in a downlink receive-only mode in which transmissions are received from the base station (and not the UEs) such as shown by way of example in FIG. 3C, but additionally or alternatively operating in an uplink receive-only mode in which transmissions are received from one or more UEs (and not the base station), a universal receive-only mode in which transmissions can be received from any suitable entities (e.g., both the base station and one or more UEs), and/or any other suitable receive-only mode.

However, the repeater can additionally or alternatively operate in repeating mode while performing S100. In a first embodiment, the repeating mode is a downlink-only mode, in which the repeater receives transmissions from the base station and repeats the received transmissions (e.g., to one or more devices, such as user equipment), such as shown by way of example in FIG. 3A. For example, the repeater can amplify and re-radiate the received transmissions (e.g., re-radiate with beamforming, such as directed toward one or more UEs). In alternate embodiments, the repeating mode can be an uplink only mode (e.g., receiving transmissions from one or more UEs and repeating the received transmissions to the base station), or can switch between uplink and downlink modes in any suitable manner. However, the repeater can additionally or alternatively operate in any other suitable manner while performing S100.

S100 is preferably performed before TDD synchronization is achieved (e.g., while determining or attempting to determine synchronization information, such as described below regarding S200), but can additionally or alternatively be performed after losing synchronization (e.g., while attempting to reestablish synchronization) and/or with any other suitable timing. However, S100 can additionally or alternatively include performing any other suitable fallback functions in any suitable manner.

2.2 Determining Synchronization Information.

Determining synchronization information S200 preferably functions to determine timing of uplink and/or downlink windows in use by a base station.

Figure 4:
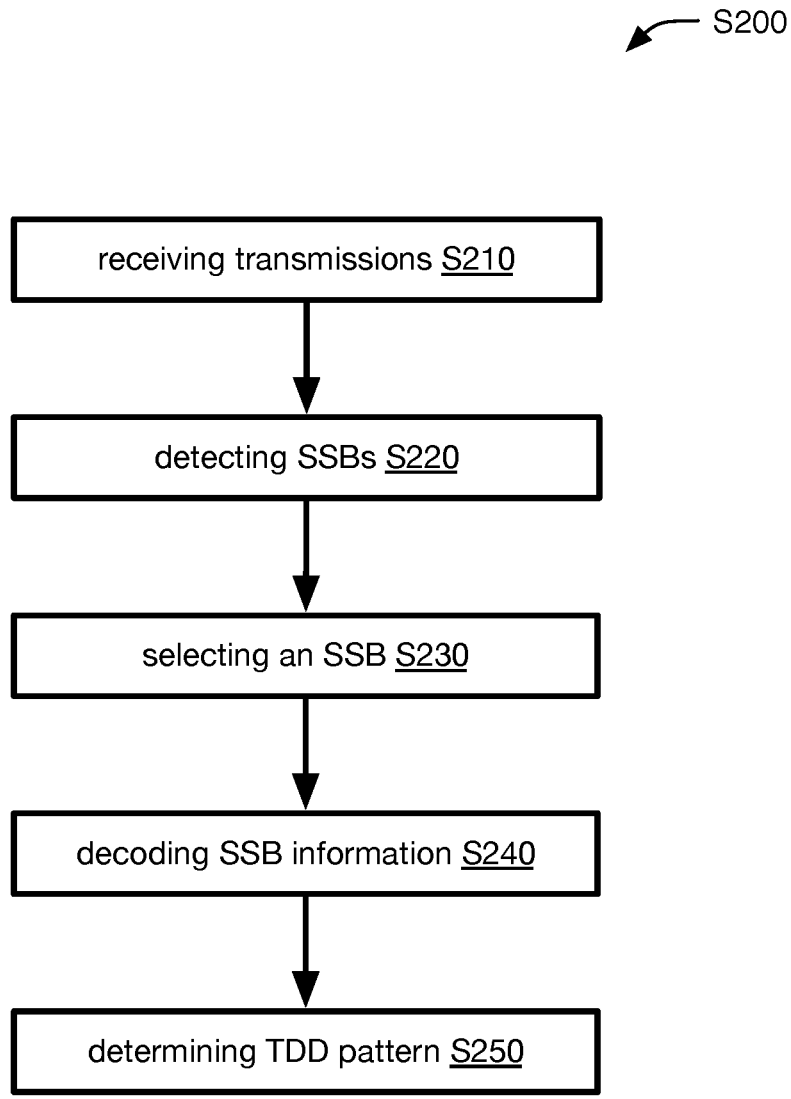
FIG. 4 is a schematic representation of an embodiment of determining synchronization information.

The synchronization information is preferably determined as is typical for 5G modem operation, such as by receiving one or more transmissions S210 (e.g., from a base station), detecting one or more synchronization signal blocks (SSBs) S220, selecting one or more of the received SSBs S230, decoding SSB information S240, and/or determining a TDD pattern S250, such as shown by way of example in FIG. 4.

Figure 5A:
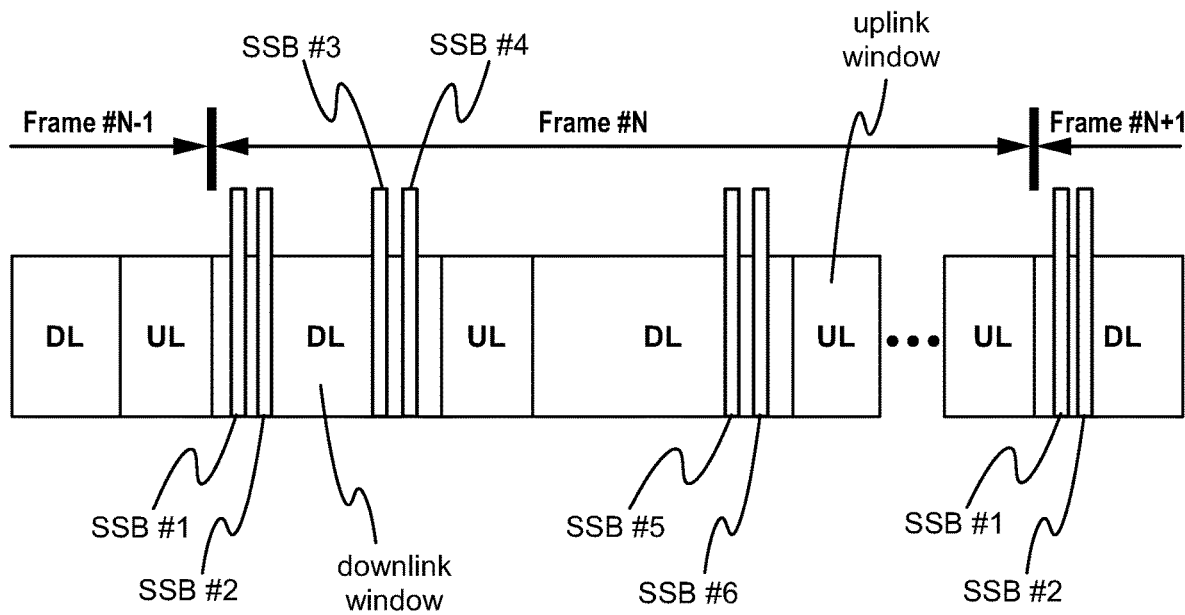
FIG. 5A is a schematic representation of an example of a communication network transmission pattern.

S210 preferably includes receiving one or more transmissions via a communication network, such as transmissions received from a base station (e.g., gNB) of the communication network (e.g., transmissions received during one or more downlink windows of the network, such as shown by way of example in FIG. 5A). Upon receipt of a transmission from a base station (and/or at any other suitable time), the received transmission is preferably stored, more preferably stored along with a timestamp (e.g., internal timestamp from a local repeater clock) such as a receipt timestamp.

Figure 5B:
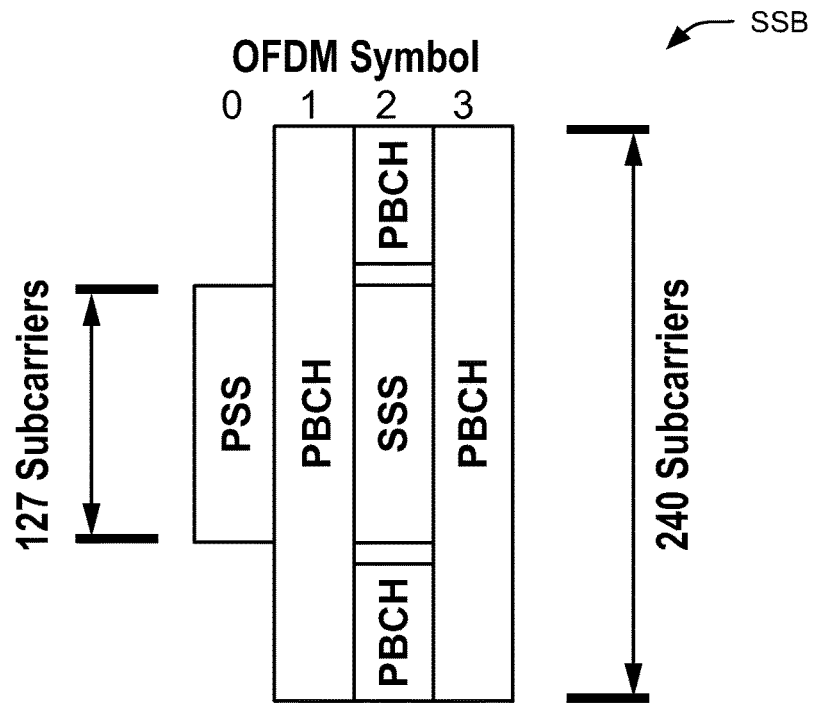
FIG. 5B is a schematic representation of an example of a synchronization signal block of a communication network.

In 5G NR networks, an SSB typically occupies a small subset of carriers (e.g., occupying 240 carriers out of more than 800 carriers per channel), thus mapping to a small frequency footprint, such as shown by way of example in FIG. 5B. Further, S200 can typically be performed using any one carrier's SSB in a carrier-aggregated signal. Accordingly, receiving the transmission S210 can include receiving and/or storing a subset of carriers (or alternatively, can include receiving and/or storing all carriers). For example, for 400 MHz bandwidth with 4 carriers (e.g., four 100 MHz channels), the SSB from only one of the channels is needed, which would occupy between 30.72 MHz to 61.44 MHz (a small fraction of the total 400 MHz signal bandwidth). Thus, in this example, S210 can include capturing a downconverted and/or downsampled waveform (e.g., with 30.72 MHz sampling rate for the 120 kHz SSB or 61.44 MHz sampling rate for the 240 kHz SSB), preferably along with a timestamp (e.g., internal timestamp). In a second example, for 100 MHz bandwidth with 5 carriers (e.g., five 20 MHz channels), the SSB from only one of the channels is needed, which would occupy between 3.84 MHz to 7.68 MHz (a small fraction of the total 100 MHz signal bandwidth). A person of skill in the art will recognize that SSBs may be transmitted in various different patterns, depending on parameters such as subcarrier spacing, frequency range, and the like; the particular carrier subset sampled may differ accordingly, but will preferably occupy only a small fraction of the total signal bandwidth, regardless of the overall signal bandwidth and/or carrier aggregation. However, the sampled carrier subset can additionally or alternatively occupy any other suitable bandwidth and/or any other suitable portion of the total signal bandwidth.

However, S210 can additionally or alternatively include receiving any suitable transmission(s) in any suitable manner.

Detecting one or more SSBs S220 can function to locate the SSB(s) within the received transmission. S220 may not include detecting all SSBs in a frame, as some SSBs may not be discernable at the repeater (e.g., due to beamforming). However, S220 can alternatively include detecting all SSBs of a frame and/or detecting any other suitable number of SSBs.

Selecting one or more of the received SSBs S230 preferably functions to select an SSB (or multiple SSBs) for timing analysis. S230 preferably includes selecting a single SSB, such as the SSB that was received with the highest signal strength, but can alternatively include selecting multiple SSBs (e.g., all discernable SSBs, all SSBs received with signal strength greater than a threshold value, etc.). However, S230 can additionally or alternatively include selecting any other suitable SSB(s) in any suitable manner.

Decoding SSB information S240 preferably functions to determine a start time (and/or any other suitable reference time, such as a time associated with any other suitable reference event within the frame) for the frame (e.g., relative to the SSB timing). Based on the decoded SSB information, a timing offset between the frame start time (or other reference time) and the SSB time can be determined. S240 preferably includes using one or more internal repeater timestamps (e.g., SSB receipt time) and the determined timing offset(s) to determine the start time of the frame (referred to the internal repeater clock). However, S240 can additionally or alternatively include determining any other suitable information based on the SSB.

Determining the TDD pattern S250 preferably functions to determine the timing of uplink and/or downlink windows relative to the frame start time (and/or relative to any other reference time within the frame, such as an SSB time). The pattern can be determined from a control message (e.g., control message received from the base station, such as a control message within the transmission received in S210), based on user input (e.g., repeater configuration, information received from another network device, etc.), determined based on any other suitable information indicative of the TDD pattern (e.g., information received from the communication network, information received separate from the communication network, etc.), and/or determined in any other suitable manner.

However, the synchronization information (e.g., frame start time and/or other frame reference time, frame period, TDD schedule such as an uplink/downlink pattern, and/or any other suitable information associated with uplink or downlink window timing) can additionally or alternatively be determined in any other suitable manner.

S200 is preferably performed while synchronization information is unavailable, such as in response to (e.g., immediately or substantially immediately in response to) repeater startup, acquisition of a base station signal, change of synchronization information, and/or any other suitable loss of synchronization. However, S200 can additionally or alternatively be performed with any other suitable timing. S200 is preferably performed concurrently with S100, but the method can additionally or alternatively include operating the repeater in any other suitable modes (and/or not operating the repeater) while performing S200.

2.3 Operating in a Synchronized Repeater Mode.

Operating in a synchronized repeater mode S300 preferably functions to provide bi-directional repeater functionality. S300 is preferably performed once synchronization is achieved (e.g., after determining synchronization information S200), more preferably while synchronization is maintained or substantially maintained, but can additionally or alternatively be performed with any other suitable timing.

Figure 6:
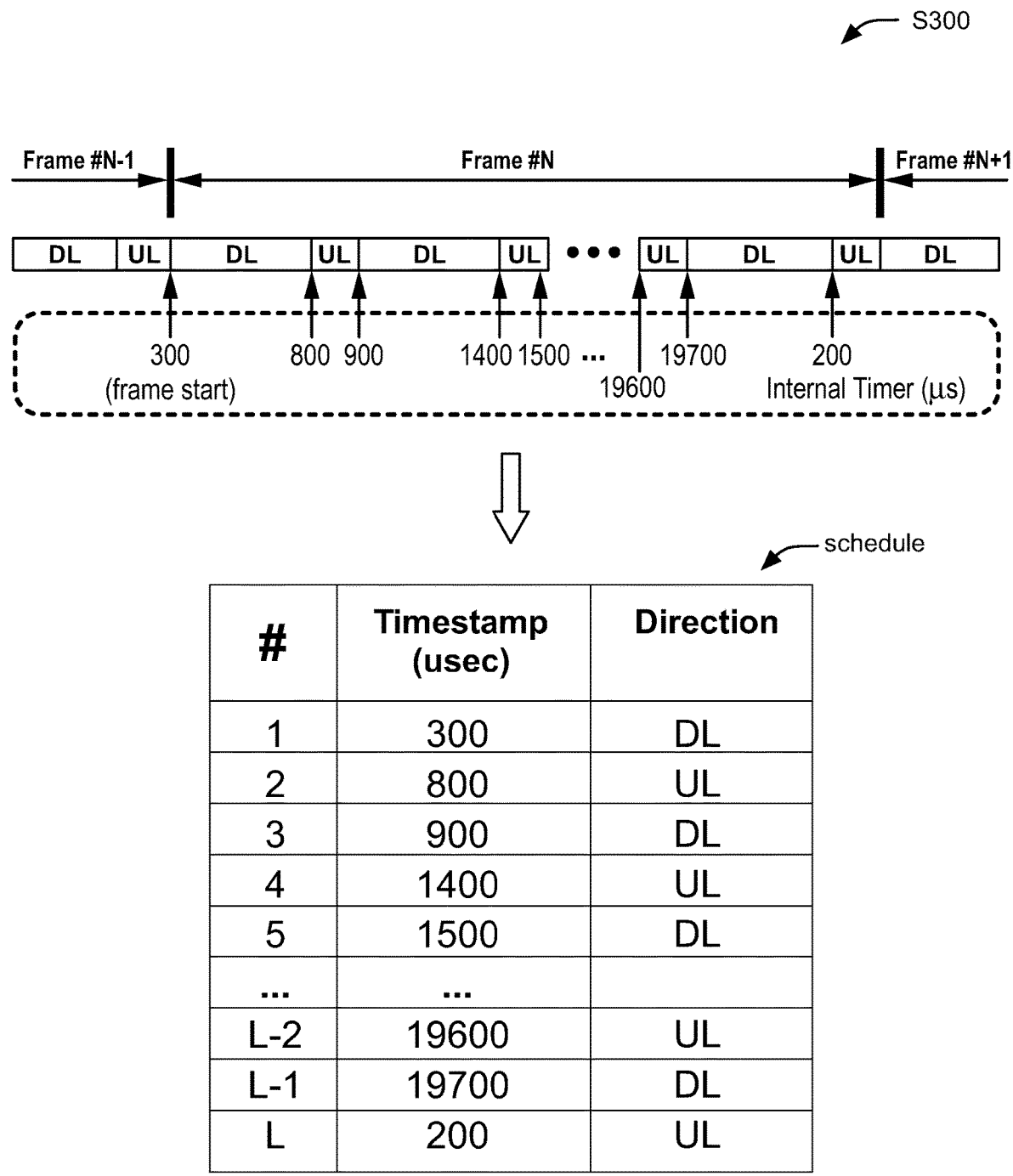
FIG. 6 is a schematic representation of an example of determining a repeater operation schedule.

S300 preferably includes determining a repeater operation schedule based on the synchronization information (e.g., based on the frame start time and uplink/downlink pattern determined in S200). For example, this can include determining a schedule table referenced to the internal repeater clock (e.g., as shown in FIG. 6). In this example, determining the schedule table can include determining the internal repeater timestamp for the start of a frame and determining additional timestamps for switching between uplink and downlink modes based on the determined uplink/downlink pattern (e.g., adding a first scheduled window duration to the frame start timestamp to generate a second timestamp, adding an Nth scheduled window duration to the Nth timestamp to generate an N+1th timestamp, etc.). However, S300 can additionally or alternatively include determining the schedule (e.g., schedule table) in any other suitable manner.

S300 preferably includes operating the repeater based on the determined schedule, such as operating the repeater in the appropriate mode (e.g., uplink mode or downlink mode) at appropriate times as indicated by the schedule. For example, this can include switching the repeater from uplink mode to downlink mode (and/or vice versa) at the scheduled switching times.

Operating in the downlink mode is preferably performed as described above regarding S100, wherein the repeater receives a transmission from the base station and re-radiates it to user equipment (e.g., as shown in FIG. 3A). Operating the repeater in the uplink mode preferably includes receiving transmissions from user equipment and re-radiating the transmissions to the base station (e.g., operating in the reverse relay direction from the downlink mode), such as shown by way of example in FIG. 3B. However, S300 can additionally or alternatively include operating the repeater in any other suitable manner.

2.4 Maintaining Synchronization.

Figure 7A:
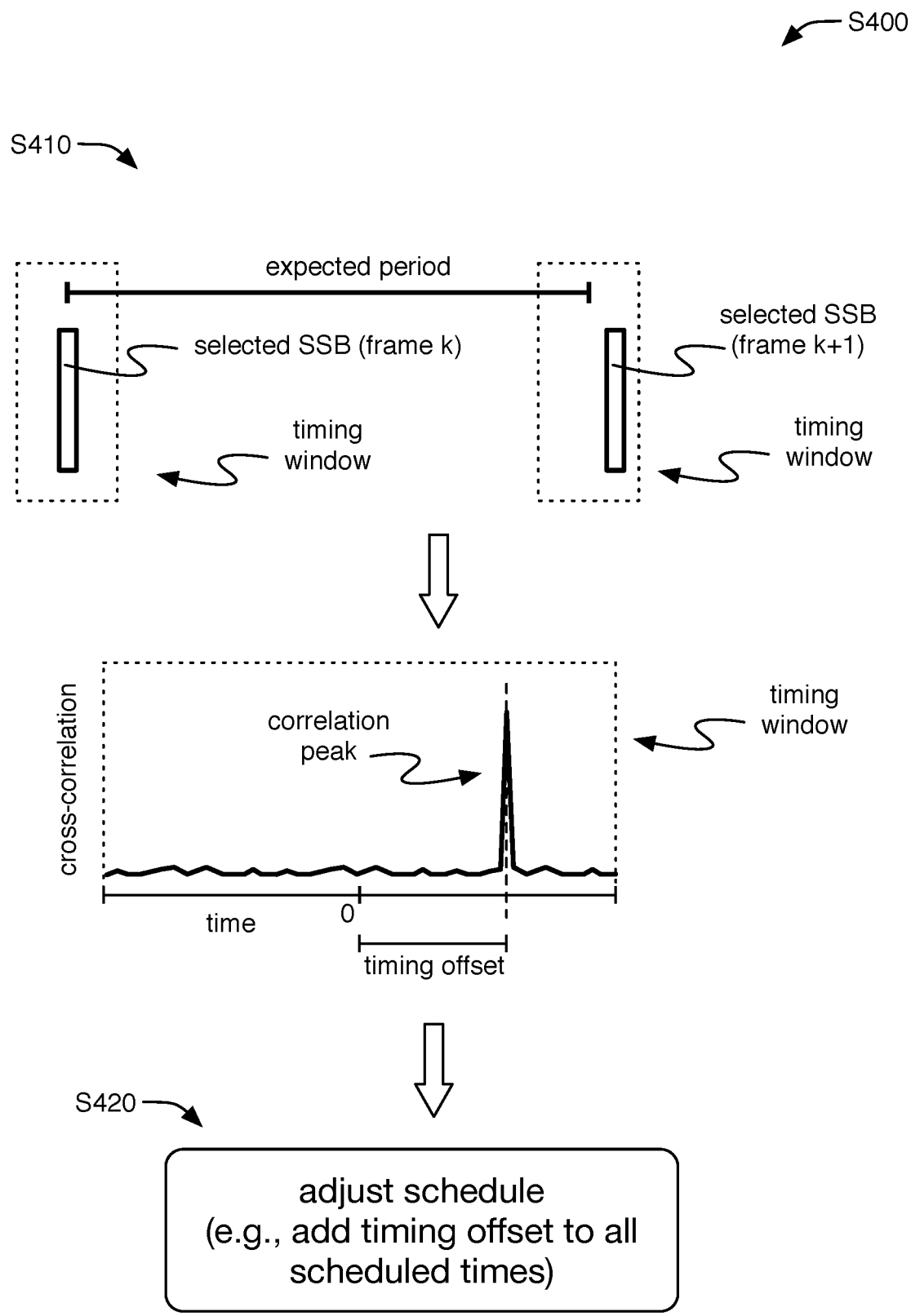
FIGS. 7A-7B and 8A-8B are schematic representations of various examples of maintaining synchronization.
Figure 7B:
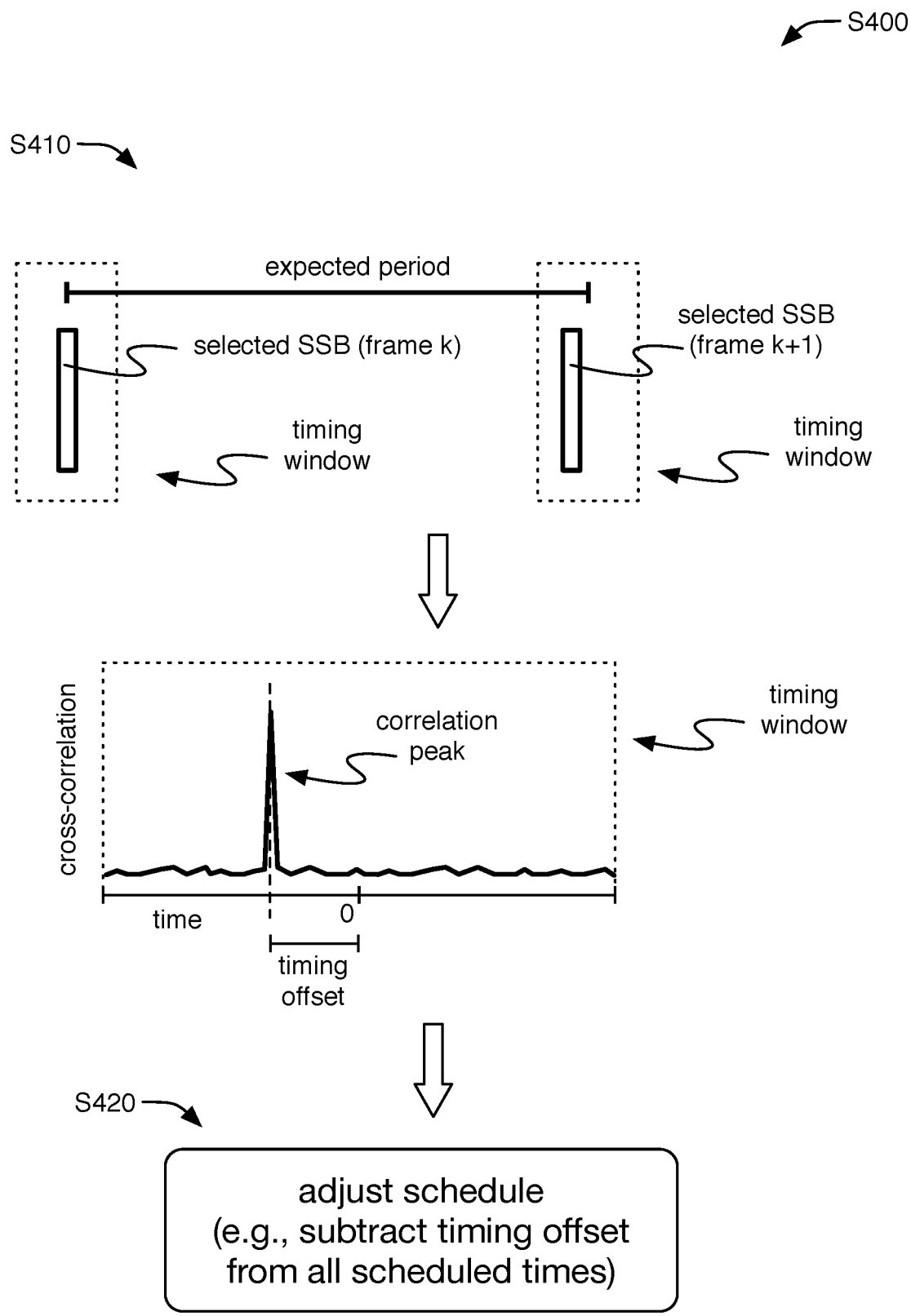
Figure 8A:
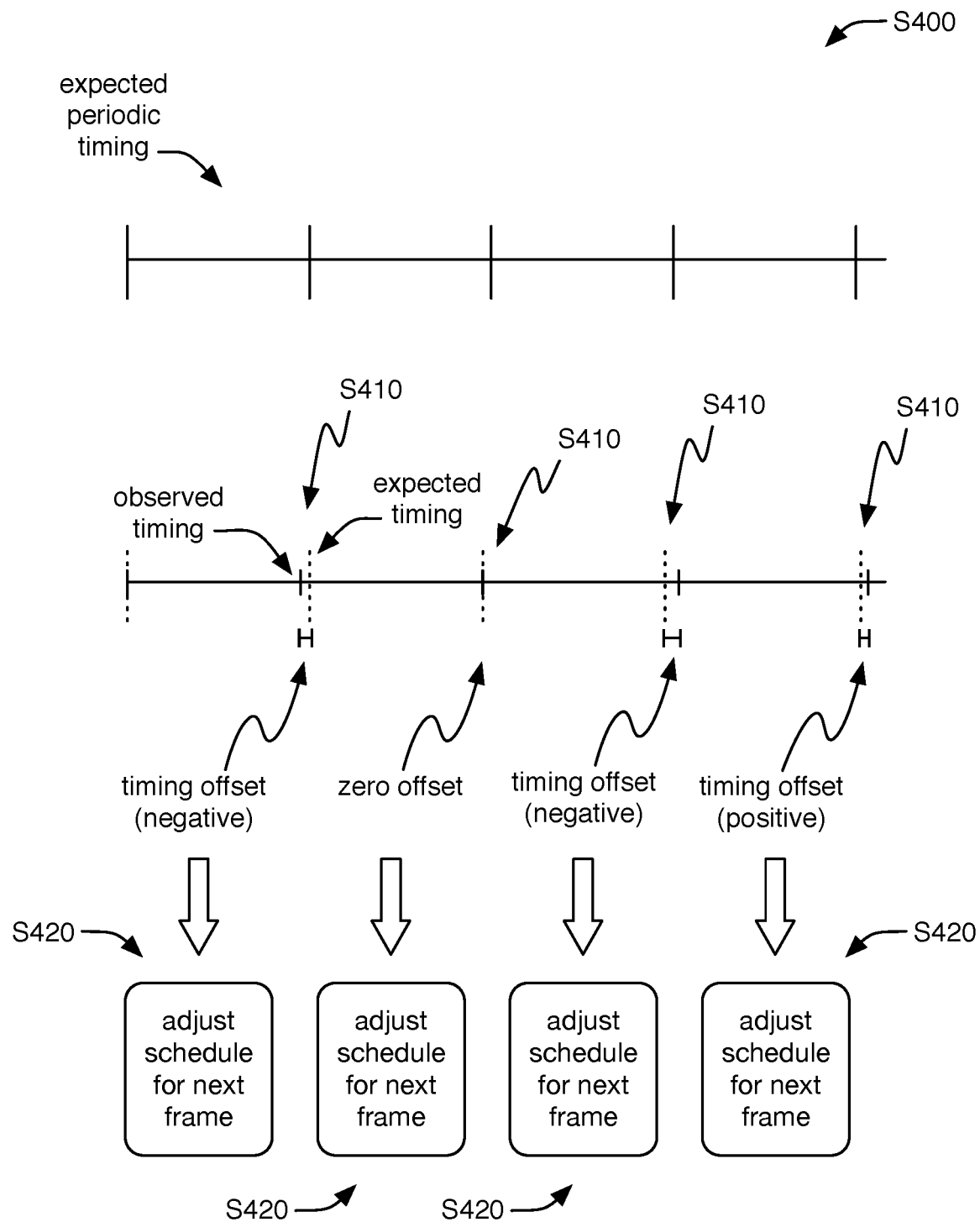

Maintaining synchronization S400 preferably functions to prevent de-synchronization from the communication network TDD schedule (e.g., due to clock drift). S400 preferably includes monitoring periodic signal timing S410 and adjusting operation timing S420 (e.g., as shown in FIGS. 7A, 7B, 8A, and/or 8B).

S410 preferably includes monitoring the timing of one or more periodic signals. S410 can include receiving a transmission within a known timing window. The known timing window is preferably selected based on an expectation that it will contain a known signal (e.g., known repeating signal, such as repeating with periodicity equal to the frame duration and/or SSB transmission cycle duration, which can be equal or substantially equal to 10 ms in some examples but can additionally or alternatively be any other suitable duration). For example, the known repeating signal can be a synchronization signal, such as the primary synchronization signal (PSS) and/or secondary synchronization signal (SSS) of an SSB. The synchronization signal used is preferably a synchronization signal from the SSB selected in S200, but can additionally or alternatively include a synchronization signal from any other suitable SSB, and/or any other suitable synchronization signal. Based on the synchronization information (e.g., frame duration and/or SSB transmission cycle duration), the expected timing of the repeating signal is known (e.g., known within a limited tolerance range, such as approximately 50, 100, 200, 400, 20-50, 50-100, 100-200, 200-500, and/or 500-1000 samples, etc.). Accordingly, S410 can include looking for the repeating signal only within a limited temporal range (e.g., within the expected timing tolerance, such as within a 200-sample window).

S410 preferably includes determining the received signal timing (of the known repeating signal) relative to its expected timing. For example, this can be achieved by determining a cross-correlation of the received transmission with the expected signal, wherein the peak of the cross-correlation will typically correspond to the offset from the expected timing (e.g., a cross-correlation peak at zero indicates that the signal occurred at the expected time, a cross-correlation peak at −10 samples indicates that the signal was received 10 samples earlier than expected, etc.). However, the received signal timing can be determined based on the received information in any other suitable manner.

Additionally or alternatively, S410 can include performing symbol timing detection, such as cyclic prefix detection. Such approaches may require averaging over multiple symbols (e.g., due to increased noise), and so may be less performant under certain circumstances.

However, S410 can additionally or alternatively include monitoring periodic signal timing in any other suitable manner.

Adjusting repeater operation timing S420 preferably functions to compensate for clock drift (e.g., drift between the base station clock and repeater clock). S420 is preferably performed based on the periodic signal (e.g., based on the periodic signal timing determined in S410). If an offset from the expected timing is detected in S410, then S420 can include adjusting the timing of repeater operation (e.g., adjusting the schedule used for operating in the synchronized repeater mode, such as described above regarding S300).

S420 preferably includes adjusting the repeater operation timing to compensate for the clock drift detected in S410. For example, S420 can include shifting the scheduled switching times of the schedule table, preferably by an amount equal (or substantially equal) to the detected offset (e.g., if the signal arrives 4 µs early, shifting all scheduled times 4 µs earlier; if the signal arrives 3 µs late, shifting all scheduled times 3 µs later; etc.). For example, an updated frame reference time $t_r^*$ can be determined based on the equation $t_r^* = t_r - t_d + n\tau$, wherein $t_r$ is a prior frame reference time, $t_d$ is the detected offset, $\tau$ is the expected frame duration, and n is a positive integer; in this example, each scheduled switching time of the schedule table can be taken to be a different frame reference time, and the appropriate updated value $t_r^*$ can be determined based on its prior value $t_r$ and the detected offset.

Figure 8B:
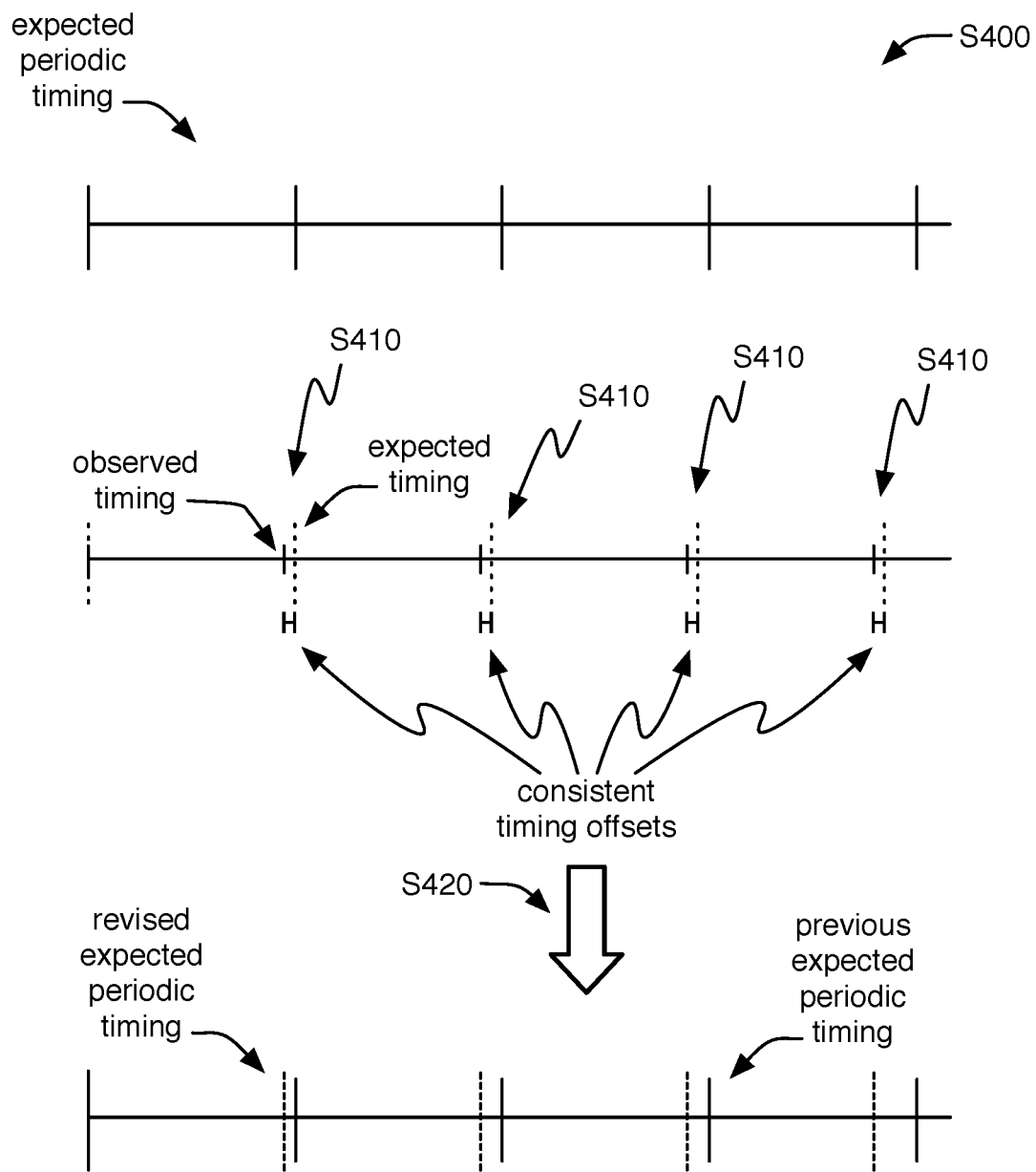

In some examples, a trend in timing drift may be detected (and/or otherwise determined to exist). For example, a timing drift trend may be detected based on a substantially constant offset from the expected timing is regularly detected (e.g., if the signal is always offset by a substantially constant amount, such as shown in FIG. 8B). Additionally or alternatively, a timing drift trend if the average offset from expected timing is substantially non-zero (e.g., substantially greater than zero or substantially less than zero), possibly wherein the absolute value of the average is greater (or substantially greater) than a threshold (e.g., fixed threshold amount, such as an absolute time or an amount of time relative to the period; dynamic threshold, such as a threshold based on the variance of the timing drift; etc.). In such examples, S420 preferably includes adjusting the expected signal periodicity accordingly to compensate, in response to determining the timing drift trend. In a first such example, if the signal consistently arrives substantially 3 µs early (and/or arrives an average of 3 µs early), the repeater operation period (e.g., frame duration, SSB transmission cycle length, etc.) can be reduced by 3 µs to compensate. In a second such example, if the signal consistently arrives substantially 2 µs late (and/or arrives an average of 2 µs late), the repeater operation period (e.g., frame duration, SSB transmission cycle length, etc.) can be increased by 2 µs to compensate.

However, S400 can additionally or alternatively include maintaining synchronization in any other suitable manner.

S400 is preferably performed while operating in the synchronized repeater mode (e.g., as described above regarding S300). S400 can be performed every signal period (e.g., frame duration, SSB transmission cycle length, etc.), can be performed with any other suitable periodicity (e.g., for a period equal to an integer multiple of the signal period or TDD schedule period), can be performed sporadically, can be performed in response to trigger events (e.g., detection of possible de-synchronization, such as detection of low or no radio traffic in the expected direction near the beginning or end of one or more TDD uplink or downlink windows, detection of an internal repeater clock error, etc.), and/or can be performed with any other suitable timing.

Although referred to herein as a frame (e.g., having a duration such as 10 ms or any other suitable duration), a person of skill in the art will recognize that, in some circumstances, the method may additionally or alternatively be performed based on any other suitable periodic aspect(s) of the communication network, such as the SSB transmission cycle (e.g., cycle length for which SSB transmission is repeated, such as 5, 10, 20, 40, 80, or 160 ms, etc.). Further, although reference is made to operations of 5G NR communications networks, a person of skill in the art will recognize that the invention can analogously be applied in any other suitable TDD communications network including one or more substantially periodic signals.

However, the method for repeater operation 20 can additionally or alternatively include any other suitable elements performed in any suitable manner.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for operating a repeater system, the method comprising:
 determining time-division duplexing (TDD) synchronization information associated with a communications network, the TDD synchronization information comprising a frame reference time and a TDD schedule, wherein determining the TDD synchronization information comprises:
  at the repeater system, receiving a transmission associated with the communications network, the transmission comprising a synchronization signal block (SSB);
  detecting the SSB within the transmission;
  determining a reception time, referred to a repeater system clock time, at which the SSB was received;
  decoding the SSB to determine an SSB reference time offset for the SSB;
  receiving configuration information indicative of the TDD schedule;
  determining the TDD schedule based on the configuration information; and
  based on the reception time and the SSB reference time offset, determining the frame reference time;
 based on the frame reference time and the TDD schedule, determining a set of downlink periods and a set of uplink periods of a communication frame of the communications network;
 operating a transceiver of the repeater system based on the TDD synchronization information, comprising, based on the frame reference time and the TDD schedule, switching transceiver operation between a downlink mode and an uplink mode such that:
  during each of the set of downlink periods, the transceiver operates in the downlink mode, comprising receiving downlink signals from a base station of the communications network and reradiating the downlink signals to user equipment of the communications network; and
  during each of the set of uplink periods, the transceiver operates in the uplink mode, comprising receiving uplink signals from the user equipment and reradiating the uplink signals to the base station;
 determining a timing offset, comprising:
  based on the reception time, the SSB reference time offset, and an expected frame duration, determining a timing window during which a second instance of the SSB is expected to be transmitted;
  during the timing window, at the transceiver, sampling a sampled signal comprising the second instance;
  determining a cross-correlation between the SSB and the sampled signal;
  selecting a correlation peak of the cross-correlation, the correlation peak associated with a delay time within the cross-correlation; and
  calculating the timing offset based on the delay time;
 based on the timing offset, determining an updated frame reference time;
 based on the updated frame reference time and the TDD schedule, determining a second set of downlink periods and a second set of uplink periods of a second communication frame of the communications network; and
 based on the updated frame reference time and the TDD schedule, switching transceiver operation between the downlink mode and the uplink mode such that:
  during each of the second set of downlink periods, the transceiver operates in the downlink mode; and
  during each of the second set of uplink periods, the transceiver operates in the uplink mode.

2. A repeater system configured to:
 determine time-division duplexing (TDD) synchronization information associated with a communications network, the TDD synchronization information comprising a frame reference time, an expected frame duration, and a TDD schedule;
 operate a transceiver of the repeater system based on the TDD synchronization information, comprising switching transceiver operation between a downlink mode and an uplink mode such that:
  during each of a set of downlink periods of the communications network, the transceiver operates in the downlink mode, comprising receiving downlink signals from a base station of the communications network and reradiating the downlink signals to user equipment of the communications network; and
  during each of a set of uplink periods of the communications network, the transceiver operates in the uplink mode, comprising receiving uplink signals from the user equipment and reradiating the uplink signals to the base station;
 determine signal timing of an instance of a repeating signal of the communications network;
 based on the signal timing, determine an updated frame reference time; and
 in response to determining the updated frame reference time, operate the transceiver based on the expected frame duration, the TDD schedule, and the updated frame reference time;
 wherein:
 determining the signal timing comprises:
  at the transceiver, receiving a transmission portion comprising the instance;
  determining a cross-correlation between the repeating signal and the transmission portion; and
  determining the signal timing based on the cross-correlation, comprising selecting a correlation peak of the cross-correlation, the correlation peak associated with a delay time within the cross-correlation;
 the repeating signal occurs once per communication frame; and
 the updated frame reference time $t_r^*$ is determined based on the equation $t_r^* = t_r - t_d + n\tau$, wherein $t_r$ is the frame reference time, $t_d$ is the delay time, $\tau$ is the expected frame duration, and n is a positive integer.

3. The system of claim 2, wherein the repeating signal comprises an element of a synchronization signal block (SSB) of the communications network.

4. The system of claim 3, wherein the repeating signal is the SSB.

5. The system of claim 2, wherein:
 determining the signal timing further comprises, based on the frame reference time and the expected frame period, determining a timing window during which the instance is expected to be transmitted; and
 receiving the transmission portion comprises selectively sampling communication network transmissions based on the timing window.

6. The system of claim 2, wherein the repeater system is configured such that:
   the transceiver operates in the downlink mode throughout each downlink period of the set; and
   the transceiver operates in the uplink mode throughout each downlink period of the set.

7. The system of claim 2, wherein the frame reference time is a frame start time.

8. The system of claim 2, wherein the frame reference time is referred to a repeater system clock time.

9. The system of claim 2, wherein the expected frame duration is predetermined.

10. The system of claim 9, wherein the expected frame duration is 10 ms.

11. The system of claim 2, wherein determining the TDD synchronization information comprises determining the TDD schedule based on predetermined information.

12. The system of claim 2, wherein determining the TDD synchronization information comprises determining the TDD schedule based on a control message received from a base station of the communications network.

13. The system of claim 12, wherein determining the TDD synchronization information further comprises:
   at the transceiver, receiving a transmission associated with the communications network, the transmission comprising a synchronization signal block (SSB) and the control message;
   detecting the SSB within the transmission;
   determining a reception time, referred to a repeater system clock time, at which the SSB was received;
   decoding the SSB to determine an SSB reference time offset for the SSB; and
   based on the reception time and the SSB reference time offset, determining the frame reference time.

14. The system of claim 2, wherein determining the signal timing comprises:
   at the transceiver, receiving a transmission portion comprising the instance;
   performing symbol timing detection on the transmission portion; and
   determining the signal timing based on the symbol timing detection.

15. The system of claim 14, wherein performing symbol timing detection comprises performing cyclic prefix detection.

16. The system of claim 2, further configured to, before determining the TDD synchronization information, operate the transceiver in a fallback mode, wherein the fallback mode comprises receiving downlink signals from the base station and not reradiating the downlink signals.

17. A repeater system configured to:
   determine time-division duplexing (TDD) synchronization information associated with a communications network, the TDD synchronization information comprising a frame reference time, an expected frame duration, and a TDD schedule;
   operate a transceiver of the repeater system based on the TDD synchronization information, comprising switching transceiver operation between a downlink mode and an uplink mode such that:
      during each of a set of downlink periods of the communications network, the transceiver operates in the downlink mode, comprising receiving downlink signals from a base station of the communications network and reradiating the downlink signals to user equipment of the communications network; and
      during each of a set of uplink periods of the communications network, the transceiver operates in the uplink mode, comprising receiving uplink signals from the user equipment and reradiating the uplink signals to the base station;
   determine signal timing of an instance of a repeating signal of the communications network;
   based on the signal timing, determine an updated frame reference time;
   in response to determining the updated frame reference time, operate the transceiver based on the expected frame duration, the TDD schedule, and the updated frame reference time;
   determine signal timing of a plurality of additional instances of the repeating signal, comprising, for each additional instance of the plurality, determining a respective timing offset between the additional instance and an expected additional instance occurrence time;
   determine that an absolute value of an average of the respective timing offsets is greater than a drift threshold;
   in response to determining that the absolute value is greater than the drift threshold, determine an updated expected frame period;
   based on the updated expected frame period and the TDD schedule, determine an updated TDD schedule; and
   operate the transceiver based on the updated TDD schedule.

18. The system of claim 17, wherein the updated expected frame period is determined based on a sum of the expected frame period and the average of the respective timing offsets.

19. The system of claim 18, wherein the updated expected frame period is equal to the sum.

20. The system of claim 17, wherein the repeater system is configured such that:
   the transceiver operates in the downlink mode throughout each downlink period of the set; and
   the transceiver operates in the uplink mode throughout each downlink period of the set.

21. The system of claim 17, further configured to, before determining the TDD synchronization information, operate the transceiver in a fallback mode.

22. The system of claim 21, wherein the fallback mode comprises receiving downlink signals from the base station and not reradiating the downlink signals.

* * * * *